(12) United States Patent
Wulff et al.

(10) Patent No.: US 11,203,414 B2
(45) Date of Patent: Dec. 21, 2021

(54) CONTROLLING AN AIRCRAFT BASED ON DETECTING AND MITIGATING FATIGUING CONDITIONS AND AIRCRAFT DAMAGE CONDITIONS

(71) Applicant: Sikorsky Aircraft Corporation, Stratford, CT (US)

(72) Inventors: Ole Wulff, Ansonia, CT (US); Derek H. Geiger, Wilton, CT (US); Mark W. Davis, Southbury, CT (US); Andrew M. Brookhart, Wallingford, CT (US); Christopher A. Thornberg, Newtown, CT (US); Stephen T. Kubik, Newtown, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 138 days.

(21) Appl. No.: 16/641,395

(22) PCT Filed: Sep. 13, 2017

(86) PCT No.: PCT/US2017/051315
§ 371 (c)(1),
(2) Date: Feb. 24, 2020

(87) PCT Pub. No.: WO2019/054997
PCT Pub. Date: Mar. 21, 2019

(65) Prior Publication Data
US 2020/0198770 A1    Jun. 25, 2020

(51) Int. Cl.
*B64C 13/50*       (2006.01)
*B64D 45/00*      (2006.01)
(Continued)

(52) U.S. Cl.
CPC ............ *B64C 13/503* (2013.01); *B64C 13/16* (2013.01); *B64D 31/06* (2013.01); *B64D 45/00* (2013.01); *B64D 2045/0085* (2013.01)

(58) Field of Classification Search
CPC ....................... B64D 2045/0085; B64D 45/00; B64D 31/06; B64C 13/503; G01M 17/00
See application file for complete search history.

(56) References Cited

U.S. PATENT DOCUMENTS 5,881,971 A     3/1999  Hickman
8,131,420 B2 *  3/2012  Lynch ................... G01M 7/025
                                            701/29.4

(Continued)

OTHER PUBLICATIONS

International Search Report and Written Opinion for PCT/US2017/051315 dated Nov. 17, 2017, 19 pages.

*Primary Examiner* — Mussa A Shaawat
(74) *Attorney, Agent, or Firm* — Baker Botts L.L.P.

(57) ABSTRACT

A computer-implemented method and system for controlling an aircraft based on detecting and mitigating fatiguing conditions and aircraft damage conditions is disclosed. According to one example, a computer-implemented method includes detecting, by a processing system, a health condition of a component of the aircraft. The method further includes determining, by the processing system, whether the health condition is one of a fatigue condition or a damage condition. The method further includes implementing, by the processing system, a first action based at least in part on determining that the health condition is a fatigue condition to mitigate the fatigue condition. The method further includes implementing, by the processing system, a second action based at least in part on determining that the health condition is a damage condition to mitigate the damage condition.

15 Claims, 4 Drawing Sheets

(51) Int. Cl.
  *B64D 31/06* (2006.01)
  *B64C 13/16* (2006.01)

(56) References Cited

U.S. PATENT DOCUMENTS

| | | | |
|---|---|---|---|
| 8,355,830 | B2 | 1/2013 | Kordonowy |
| 8,914,205 | B2* | 12/2014 | Chandran ............... G06F 17/00 |
| | | | 701/51 |
| 9,020,689 | B2 | 4/2015 | Smith et al. |
| 9,064,357 | B1* | 6/2015 | McCormick ........... B64D 45/00 |
| 9,081,409 | B2 | 7/2015 | Soles et al. |
| 9,102,399 | B2 | 8/2015 | Sahasrabudhe et al. |
| 9,156,567 | B2 | 10/2015 | Covington et al. |
| 9,448,558 | B2 | 9/2016 | Litwinowicz et al. |
| 9,701,420 | B1* | 7/2017 | Tucker .................... G07C 5/008 |
| 10,364,050 | B2* | 7/2019 | Brookhart .............. G06Q 10/08 |
| 10,683,106 | B2* | 6/2020 | Minnella .................. G01K 1/14 |
| 10,878,645 | B2* | 12/2020 | Ciaburri ................. G07C 5/008 |
| 2006/0004499 | A1* | 1/2006 | Trego ..................... G07C 5/085 |
| | | | 701/31.4 |
| 2007/0260726 | A1* | 11/2007 | Rozak ................... G08G 5/0013 |
| | | | 709/224 |
| 2009/0143871 | A1 | 6/2009 | Gao et al. |
| 2009/0157358 | A1* | 6/2009 | Kim ..................... G01M 5/0033 |
| | | | 702/185 |
| 2010/0131238 | A1* | 5/2010 | Boldrin .................. G05B 23/02 |
| | | | 702/182 |
| 2010/0161244 | A1* | 6/2010 | Ghoshal ................. G01N 29/14 |
| | | | 702/35 |
| 2011/0112878 | A1* | 5/2011 | Isom ..................... G05B 23/024 |
| | | | 705/7.13 |
| 2011/0245999 | A1 | 10/2011 | Kordonowy |
| 2011/0313614 | A1* | 12/2011 | Hinnant, Jr. ........ G01M 5/0041 |
| | | | 701/33.9 |
| 2013/0197739 | A1* | 8/2013 | Gallagher ................. B64F 5/60 |
| | | | 701/31.5 |
| 2013/0304400 | A1* | 11/2013 | Isom ..................... B64C 27/006 |
| | | | 702/41 |
| 2015/0039159 | A1* | 2/2015 | Litwinowicz .......... B64D 43/00 |
| | | | 701/3 |
| 2015/0100181 | A1* | 4/2015 | Strauss ................... B64C 27/14 |
| | | | 701/3 |
| 2015/0105970 | A1* | 4/2015 | Harrigan ............... B64D 45/00 |
| | | | 701/32.8 |
| 2015/0274315 | A1 | 10/2015 | Conrad |
| 2016/0036513 | A1* | 2/2016 | Klippert ................. H04B 7/155 |
| | | | 455/15 |
| 2016/0052640 | A1* | 2/2016 | Buehler .................. G07C 5/008 |
| | | | 340/945 |
| 2017/0115253 | A1* | 4/2017 | Cokonaj ................. G01N 29/04 |
| 2017/0186249 | A1* | 6/2017 | Bandy .................. G07C 5/0816 |
| 2017/0233104 | A1* | 8/2017 | Bolling .................. G07C 5/008 |
| | | | 701/2 |
| 2017/0261406 | A1* | 9/2017 | Dion .................. G05B 23/0221 |
| 2017/0331844 | A1* | 11/2017 | Harrigan ............... G06N 7/005 |
| 2018/0170532 | A1* | 6/2018 | Black .................... G01M 5/0066 |
| 2018/0275044 | A1* | 9/2018 | Surana ................... G01M 99/005 |
| 2019/0128191 | A1* | 5/2019 | Moravek ................ F02C 7/275 |

* cited by examiner

CONTROLLING AN AIRCRAFT BASED ON DETECTING AND MITIGATING FATIGUING CONDITIONS AND AIRCRAFT DAMAGE CONDITIONS

CROSS REFERENCE TO RELATED APPLICATIONS

This application is a National Stage application of PCT/US2017/051315, filed Sep. 13, 2017, which is incorporated by reference in its entirety herein.

BACKGROUND OF THE INVENTION

Aspects of the present invention are directed to a system for flying an aircraft and, in particular, to a system for controlling an aircraft based on detecting and mitigating fatiguing conditions and aircraft damage conditions.

Aircraft and dynamic components thereof are subject to structural faults, including cracks, corrosion, elastomeric degradation, delamination, penetration due to foreign object impact, erosion, creep, buckling, etc. The aircraft and its components can also fatigue over time from continued use. Determining fatigue conditions (e.g., determining that a component is fatiguing rapidly or nearing the end of its useful fatigue life) and determining damage conditions (e.g., determining that a component of the aircraft has suffered damage) and alleviating or mitigating these conditions to allow safe continued flight enhances vehicle safety, reliability, and availability and reduces maintenance costs.

SUMMARY OF THE INVENTION

According to an aspect of the present invention, a computer-implemented method for controlling an aircraft includes: detecting, by a processing system, a health condition of a component of the aircraft; determining, by the processing system, whether the health condition is one of a fatigue condition or a damage condition; based at least in part on determining that the health condition is a fatigue condition, implementing, by the processing system, a first action to mitigate the fatigue condition; and based at least in part on determining that the health condition is a damage condition, implementing, by the processing system, a second action to mitigate the damage condition.

According to an aspect of the present invention, the first action is adjusting a command bandwidth and limits to constrain maneuverability of the aircraft.

According to an aspect of the present invention, the first action is adjusting feedback crossover frequencies and attenuating resonance frequencies to lower fatiguing loads.

According to an aspect of the present invention, the first action is issuing an alert to a pilot that maneuvering characteristics are being reduced based on the detected fatigue condition.

According to an aspect of the present invention, the fatigue condition is determined based at least in part on an estimated remaining useful life of the component of the aircraft.

According to an aspect of the present invention, the second action is adjusting command bandwidth, and/or limits to constrain maneuverability of the aircraft.

According to an aspect of the present invention, the second action is adjusting feedback gains to accommodate for modified aircraft dynamics or alteration of aircraft control power.

According to an aspect of the present invention, the second action is issuing an alert to a pilot that maneuvering characteristics are being reduced based on the detected damage condition.

According to an aspect of the present invention, the second action is issuing an updated feed forward command to accommodate for modified aircraft dynamics or alteration of aircraft control power.

According to an aspect of the present invention, the second action is reconfiguring aircraft control inputs to mitigate effects of the damage condition.

According to an aspect of the present invention, the second action depends on a severity of the damage condition.

According to an aspect of the present invention, a system for controlling an aircraft includes: a fatigue management module configured to determine a fatigue condition; a damage detection module configured to determine a damage condition; and a flight controller to implement an action when one of the fatigue condition or the damage condition is detected.

According to an aspect of the present invention, when the fatigue condition is detected, the action is selected from the group consisting of adjusting a command model to constrain maneuverability of the aircraft, adjusting feedback to lower fatiguing loads, and issuing an alert to a pilot that the maneuvering characteristics are being reduced based on the detected fatigue condition.

According to an aspect of the present invention, the fatigue condition is determined based at least in part on an estimated remaining useful life of the component of the aircraft According to an aspect of the present invention, when the damage condition is detected, the action is selected from the group consisting of adjusting command model to constrain maneuverability of the aircraft, adjusting feedback to accommodate modified aircraft dynamics, issuing an updated feed forward command to accommodate modified aircraft dynamics, reconfiguring aircraft control inputs to mitigate effects of the damage condition, and issuing an alert to a pilot that the maneuvering characteristics are being reduced based on the detected damage condition These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Load alleviation control and tactile cueing can be implemented in aircraft to lower flight loads and alert a user (e.g., a pilot, a crew member, etc.) to high load and potentially damaging conditions. However, existing load reducing measures and tactile cueing for high load and potentially damaging conditions are agnostic to a health management system in the aircraft and to damage detection techniques used in the aircraft to detect damage to the aircraft and its components.

According to one or more embodiments of the present invention, a fatigue condition is detected and a health management system implements an action to lower flight loads to extend component service life. Examples of actions to lower flight loads can include adjusting command bandwidth and/or limits to constrain maneuverability, adjusting feedback to lower fatiguing loads, and issuing an alert (e.g., a tactile cue, an alert message, etc.) to a pilot that the maneuvering characteristics are being reduced based on the detected fatigue condition.

According to one or more embodiments of the present invention, a damage condition is detected and an aircraft damage management system implements an action to enable the pilot to continue safe operation of the aircraft. Depending on the severity of the damage, the aircraft damage management system can enable the aircraft to make a safe landing, to fly back to a safe location (e.g., an airfield), and/or to complete a mission. Examples of actions to enable continued safe operation of the aircraft can include adjusting command bandwidth and/or limits to constrain maneuverability, adjusting feedback to accommodate a modified aircraft dynamics, issuing an alert (e.g., a tactile cue, an alert message, etc.) to a pilot that the maneuvering characteristics are being reduced based on the detected aircraft damage, issuing an updated feed forward command to accommodate modified aircraft dynamic, and reconfiguring aircraft control inputs to mitigate the effect of the damage.

By decreasing loads and providing alerts to the pilot based on health management system and damage detection system outputs, the rate of further damage accumulation or progression can be reduced or minimized. Moreover, safety can be increased because the aircraft can be operated safely (e.g., within a reduced flight envelope) to prevent a fatiguing or damaged component from experiencing a catastrophic failure (e.g., a crash). Aircraft availability can also be increased by reducing the need for unplanned maintenance.

Figure 1:
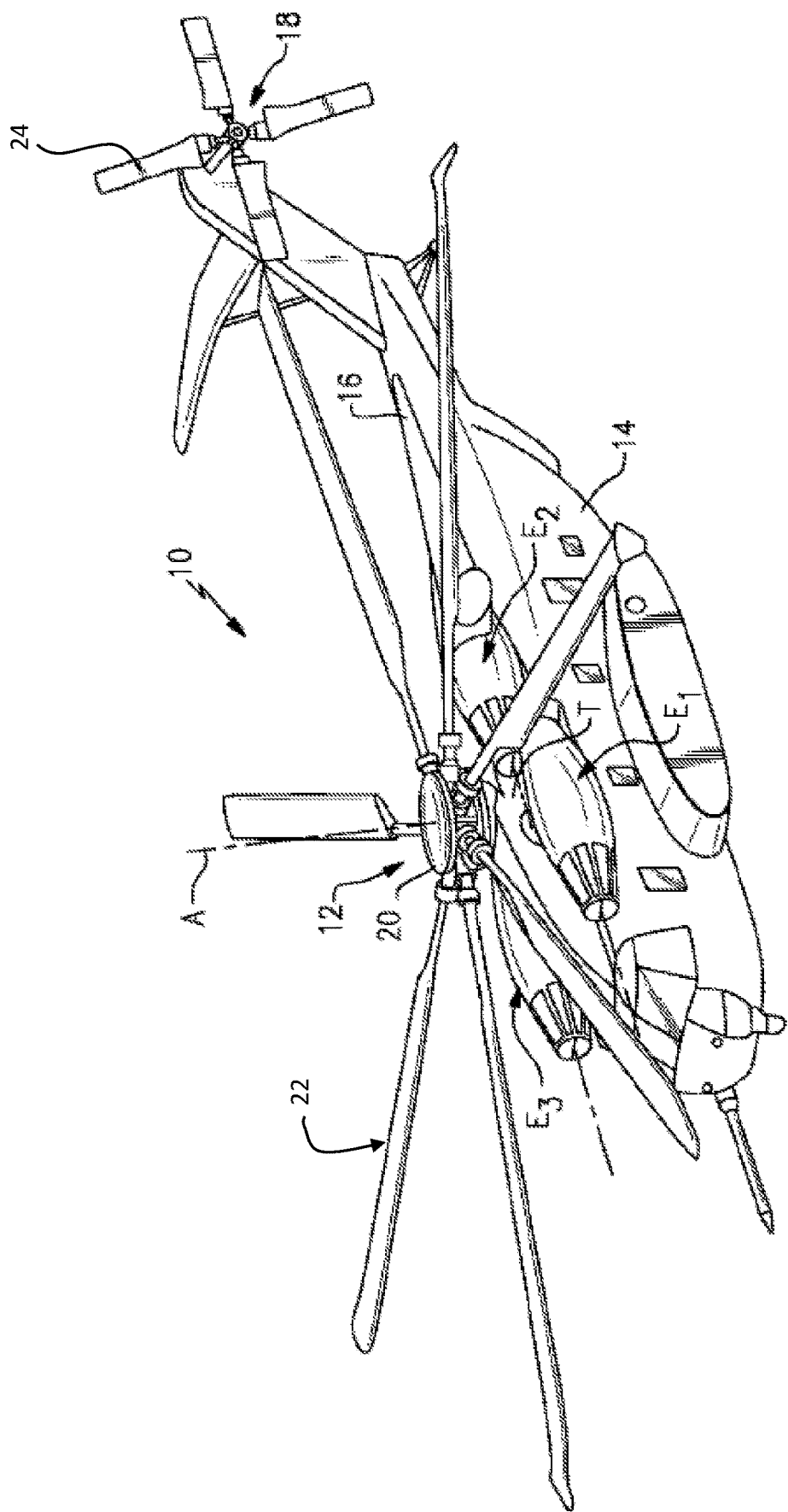
FIG. 1 illustrates a perspective view of an example of a rotary wing aircraft according to aspects of the present disclosure.

Referring now to the figures, FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
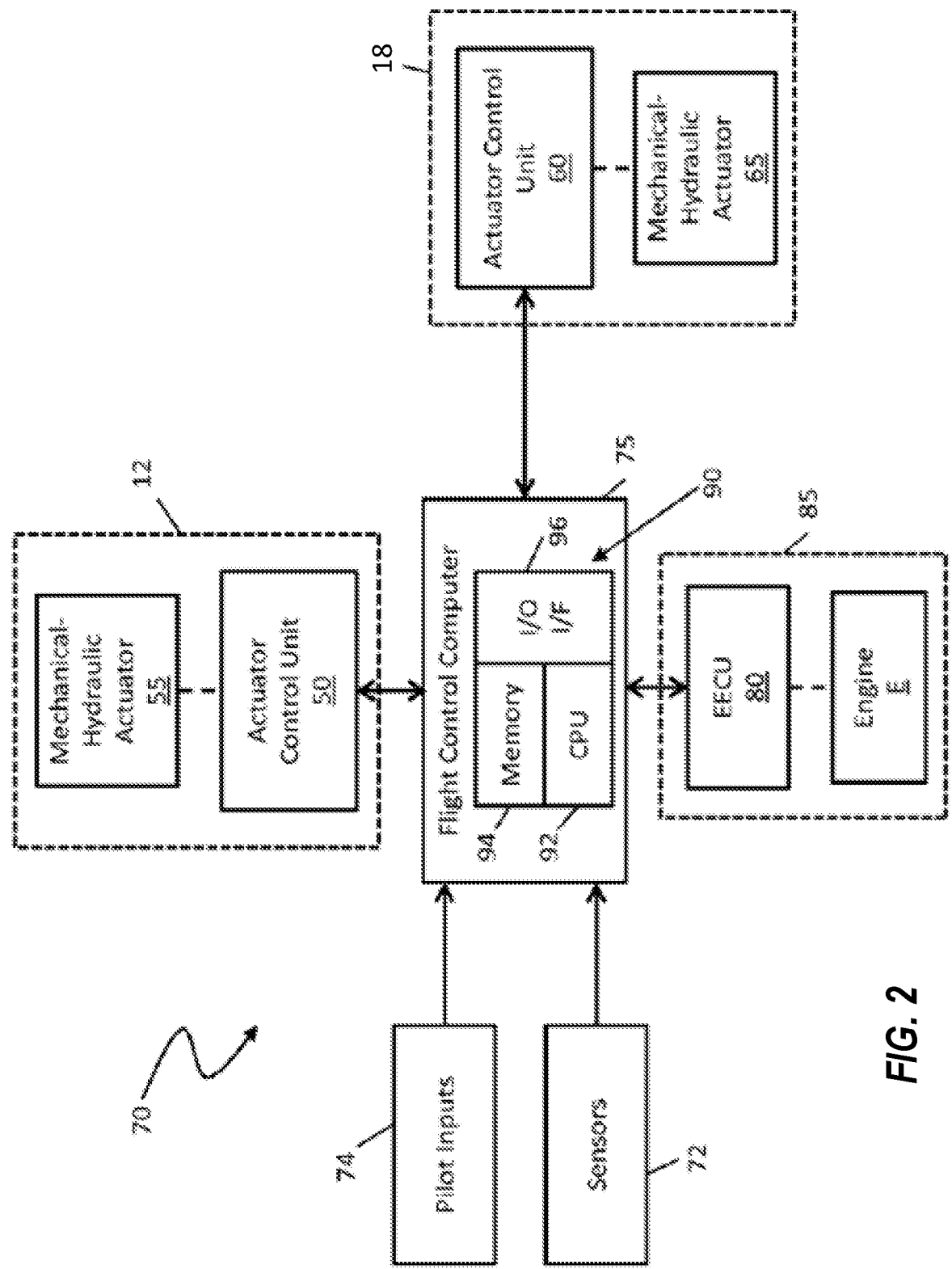
FIG. 2 illustrates a block diagram of a flight control system of an aircraft according to aspects of the present disclosure.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or tail rotor blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 can also be used directly and indirectly to provide a variety of aircraft state data to a flight control computer (FCC) 75. The FCC 75 can also receive pilot inputs 74 as control commands to control the lift, propulsive thrust, yaw, pitch, and roll forces and moments of the various control surfaces of the aircraft 10.

Although a particular aircraft configuration is illustrated and described in the disclosed embodiment, other configurations of aircraft and vehicles, such as single and/or multi-engine fixed wing aircraft, vertical take-off and landing (VTOL) rotary wing aircraft, high speed compound rotary wing aircraft with supplemental translational thrust systems, dual contra-rotating, coaxial rotor system aircraft, tilt-rotors and tilt-wing aircraft, and fixed-wing aircraft can also benefit from embodiments of the disclosure.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands can result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more tail rotor or propeller blades 24. In an embodiment, pilot inputs 74 include a blade pitch command for the actuator control unit 60 to drive the one or more actuators 65 for controlling the tail rotor blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 can be a digital electronic control unit such as Full Authority Digital Engine Control (FADEC) electronically interconnected to a corresponding engine E. Each engine E can include one or more instances of the EECU 80 to control engine output and performance. Engines E can be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application-specific integrated circuit, programmable logic device, and/or field programmable gate array, and is generally referred to as central processing unit (CPU) 92. The memory 94 can include volatile and non-volatile memory, such as random-access memory (RAM), read-only memory (ROM), or other electronic, optical, magnetic, or any other computer-readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and can communicate with the control units 50, 60, 80, and other subsystems (not depicted).

Figure 3:
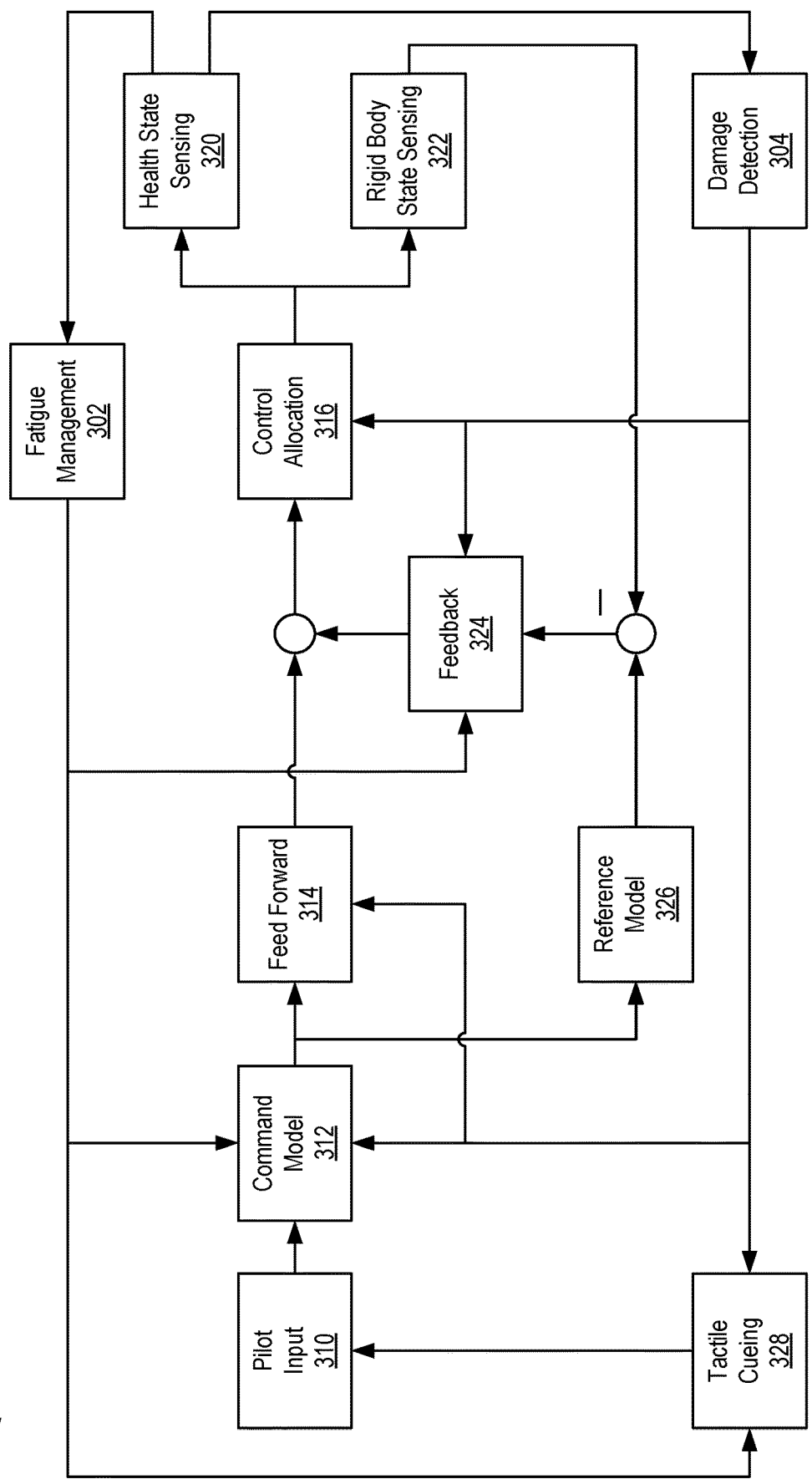
FIG. 3 depicts a block diagram of the flight control computer of FIG. 2 for controlling an aircraft based on detecting fatiguing conditions and aircraft damage according to according to aspects of the present disclosure.

FIG. 3 depicts a block diagram of the flight control computer (FCC) 75 of FIG. 2 for controlling an aircraft based on detecting fatiguing conditions and aircraft damage according to according to aspects of the present disclosure. The FCC 75 (also referred to as a "flight controller") includes a fatigue management module 302, a damage detection module 304, a pilot input module 310, a command module 312, a feed forward module 314, a control allocation module 316, a health state sensing module 320, a rigid body state sensing module 322, a feedback module 324, a reference model module 326, and a tactile cueing module 328, configured and arranged as shown. Although illustrated as separate modules, the fatigue management module 302 and the damage detection module 304 can be combined according to aspects of the present disclosure.

The fatigue management module 302 and the damage detection module 304 detect the respective fatiguing and damage conditions and provide indications thereof to the FCC 75 to implement actions. In particular, the fatigue management module 302 detects fatiguing conditions within the aircraft 10 and its various components (e.g., the main rotor assembly 12, the airframe 14, the tail 16, the tail rotor system 18, etc.). The fatigue management module 302 can receive sensor data from sensors (e.g., sensors 72) positioned throughout the aircraft 10 to monitor the aircraft 10 and its various components. The fatigue management module 302 can analyze the sensor data to determine that a fatiguing condition exists.

The damage detection module 304 detects damage conditions within the aircraft 10 and its various components (e.g., the main rotor assembly 12, the airframe 14, the tail 16, the tail rotor system 18, etc.). The damage detection module 304 can receive sensor data from sensors (e.g., sensors 72) positioned throughout the aircraft 10 to monitor the aircraft 10 and its various components. The damage detection module 304 can analyze the sensor data to determine that a damage condition exists.

The pilot input module 310 receives pilot inputs 74 as control commands to control the lift, propulsive thrust, yaw, pitch, and roll forces and moments of the various control surfaces of the aircraft 10 and, based on the received control commands, generates control signals based on the received control commands. The command model module 312 generates a body rate or attitude command with known, good response characteristics based on the received pilot inputs. The fatigue management module 302 and/or damage detection module 304 can send signals to the command module 312 to change the bandwidth and/or the command limits to constrain maneuverability of the aircraft, such as by reducing the operating envelope of the aircraft.

The feed forward module 314 generates an initial control input based on the commanded body rate or attitude in the control system architecture, and sends an initial control input to the control allocation module 316. The control allocation module 316 generates control signals for controlling the aircraft 10 and sends the control signals to the engine and to an aircraft dynamics module (not shown), which controls the engine and control surfaces of the aircraft 10. The damage detection module 304 can send signals to feed forward module 314 whereby the aircraft response dynamics are updated to be representative of the damaged aircraft dynamics.

The damage detection module 304 can send signals to the control allocation module 316 to cause the control allocation module 316 to modify and implement actions based on a detected damage condition. The control allocation module 316 can reconfigure aircraft control inputs to mitigate effects of the damage condition, such as reducing throttle limits to reduce engine output, redistributing control between various control surfaces (e.g., between main rotor system 12 and vertical tail (not shown)), and/or deactivating a control pathway such as to the tail rotor system 13.

Sensors included in the health state sensing module 320 and the rigid body state sensing module 322 collect data about the aircraft 10 and its health. The sensed data can be used by the fatigue management module 302 and/or the damage detection module 304 to determine fatiguing and/or damage conditions.

The feedback 324 module provides compensation for imperfect feed forward control inputs and additionally provides disturbance rejection, stability robustness in order to eliminate error in the reference model 326. Since the feed forward module 314 provides an approximate aircraft response, various feedbacks, including rate and attitude feedback, are used to compensate for any error between an aircraft's actual and commanded values. The fatigue management module 302 and/or the damage detection module 304 can provide an indication of detected fatigue/damage conditions to the feedback module 324 to enable the feedback module 324 to adjust feedback gains or filtering to lower fatiguing loads or to accommodate a modified aircraft dynamic, for example.

The fatigue management module 302 and/or the damage detection module 304 can send signals to the tactile cueing module 328, which can alert a pilot of the aircraft 10 to a reduced flight limit condition due to a fatiguing and/or damage condition. For example, the tactile cueing module 328 can display an alert message on a display visible to the pilot that a reduced flight envelope exists to avoid a fatiguing and/or compensate for a damage condition. The tactile cueing module 328 can also play auditory warnings to the pilot, can send tactile feedback to the pilot, such as through a joystick or other controller.

The various components, modules, engines, etc. described regarding FIG. 3 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include processing circuitry 92 for executing those instructions. Thus a system memory can store program instructions that when executed by processing circuitry 92 implement the engines described herein. Other engines can also be utilized to include other features and functionality described in other examples herein. Alternatively or additionally, the FCC 75 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 4:
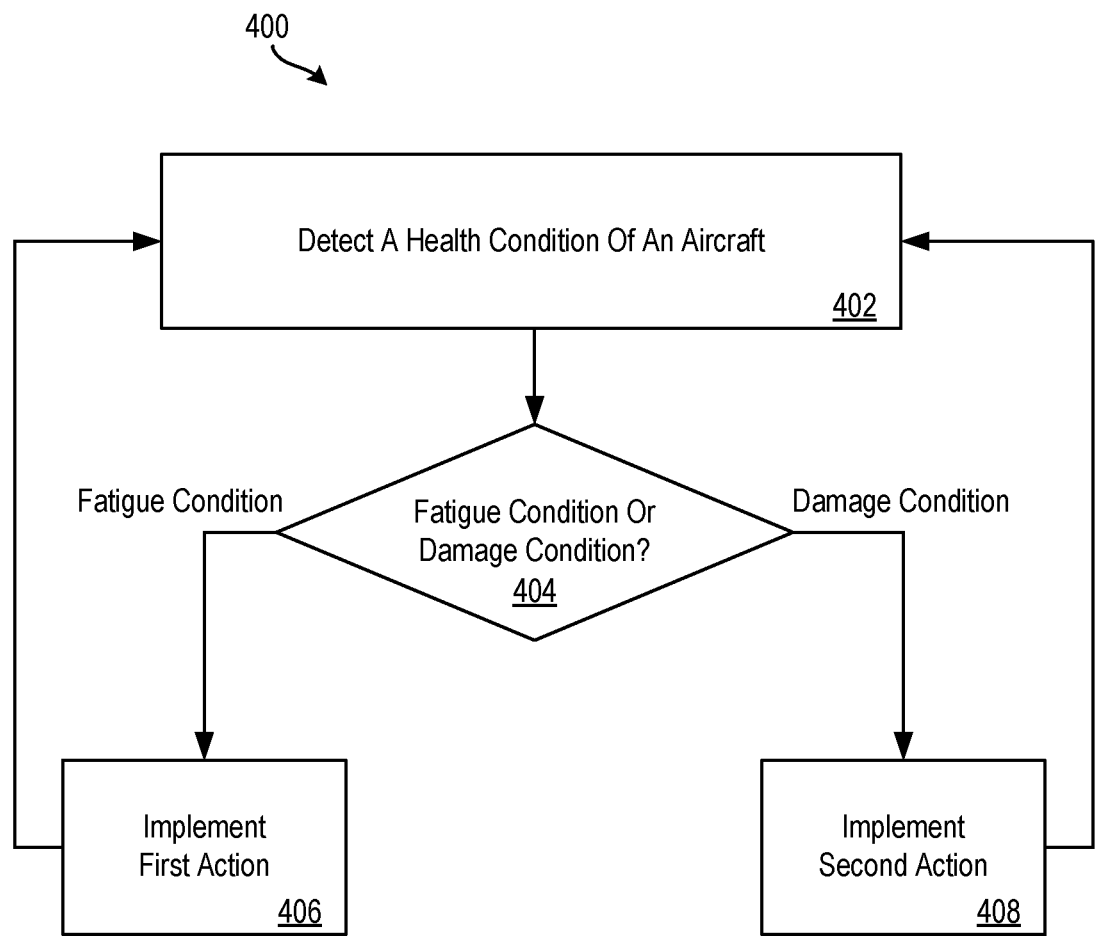
FIG. 4 depicts a method for controlling an aircraft based on detecting fatiguing conditions and aircraft damage according to according to aspects of the present disclosure.

FIG. 4 depicts a method 400 for controlling an aircraft based on detecting fatiguing conditions and aircraft damage according to aspects of the present disclosure. The method 400 can be implemented, for example, by the FCC 75 of FIGS. 2 and 3, or by another suitable processing system.

The method 400 begins at block 402 and includes detecting a health condition of an aircraft (e.g., the aircraft 10). The health condition can be detected by one or more of the fatigue management module 302 and the damage detection module 304. The health condition can be detected based on sensor data received from sensors monitoring the aircraft and its various components, for example.

At decision block 404, the method includes determining whether the health condition is a fatigue condition or a damage condition. A fatigue condition indicates that a component of the aircraft is accruing fatigue damage or nearing the end of its useful life. For example, stresses to the airframe 14 can cause the airframe 14 to fatigue (e.g., cracks can develop in the airframe 14, joints in the airframe 14 can begin to separate/weaken, etc.). In another example, a transmission (not shown) experiences fatigue damage throughout a predetermined useful life (e.g., 5,000 hours). The rate that fatigue damage actually accrues can be reduced based on how the aircraft is flown. Fatigue monitoring and management can result in much longer allowable time on wing than the predetermined useful life and enables triggering of part removal before reaching the end of its useful life or experiencing failure.

A damage condition indicates that a component of the aircraft has already failed or has been damaged. For example, if a fastener of the airframe 14 breaks, becomes loose, or falls out (e.g., from vibrations), the airframe 14 may be considered damaged, but not failed because of redundant fasteners and load paths. In another example, if a rotor is damaged, such as by a bird strike, the rotor may be considered damaged.

At block 406, the FCC 75 (or a sub-component thereof, such as the fatigue management module 302) implements a first action when it is determined at decision block 404 that the health condition is a fatigue condition. Examples of actions (i.e., the first action) to lower flight loads can include adjusting command bandwidth to limit maneuverability, adjusting feedback gains to lower fatiguing loads, and issuing an alert (e.g., a tactile cue, an alert message, etc.) to a pilot to alert the pilot to the fatigue condition.

At block 408, the FCC 75 (or a sub-component thereof, such as the damage detection module 304) implements a second action when it is determined at decision block 404 that the health condition is a damage condition. Depending on the severity of the damage, different actions can be implemented to enable the aircraft 10 to make a safe landing, to fly back to a safe location (e.g., an airfield), and/or to complete a mission. Examples of actions (i.e., the second action) to enable continued safe operation of the aircraft can include adjusting command bandwidth to limit maneuverability, adjusting feedback gains to accommodate a modified aircraft dynamic, issuing an alert (e.g., a tactile cue, an alert message, etc.) to a pilot to the detected aircraft damage, issuing an updated feed forward command to accommodate modified aircraft dynamics and reconfiguring aircraft control inputs to mitigate the effect of the damage.

Additional processes also can be included, and it should be understood that the processes depicted in FIG. 4 represent illustrations and that other processes can be added or existing processes can be removed, modified, or rearranged without departing from the scope and spirit of the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description.

What is claimed is:

1. A computer-implemented method for controlling an aircraft, comprising:
   detecting, by a processing system, a health condition of a component of the aircraft;
   determining, by the processing system, whether the health condition is one of a fatigue condition or a damage condition, including:
      determining, by the processing system, whether the health condition includes determining that a component of the aircraft is being stressed indicating the fatigue condition, and
      determining, by the processing system, whether the health condition includes determining that the component of the aircraft is structurally broken indicating the damage condition;
   based at least in part on determining that the health condition is the fatigue condition, implementing, by the processing system, a first action to mitigate the fatigue condition of the component of the aircraft being stressed; and
   based at least in part on determining that the health condition is the damage condition, implementing, by the processing system, a second action to mitigate the damage condition of the component of the aircraft being structurally broken.

2. The computer-implemented method of claim 1, wherein the first action is adjusting a command bandwidth and limits to constrain maneuverability of the aircraft.

3. The computer-implemented method of claim 1, wherein the first action is adjusting feedback crossover frequencies and attenuating resonance frequencies to lower fatiguing loads.

4. The computer-implemented method of claim 1, wherein the first action is issuing an alert to a pilot that maneuvering characteristics are being reduced based on the detected fatigue condition.

5. The computer-implemented method of claim 1, wherein the fatigue condition is determined based at least in part on an estimated remaining useful life of the component of the aircraft.

6. The computer-implemented method of claim 1, wherein the second action is adjusting command bandwidth and limits to constrain maneuverability of the aircraft.

7. The computer-implemented method of claim 1, wherein the second action is adjusting feedback gains to accommodate for modified aircraft dynamics or alteration of aircraft control power.

8. The computer-implemented method of claim 1, wherein the second action is issuing an alert to a pilot that maneuvering characteristics are being reduced based on the detected damage condition.

9. The computer-implemented method of claim 1, wherein the second action is issuing an updated feed forward command to accommodate for modified aircraft dynamics or alteration of aircraft control power.

10. The computer-implemented method of claim 1, wherein the second action is reconfiguring aircraft control inputs to mitigate effects of the damage condition.

11. The computer-implemented method of claim 1, wherein the second action depends on a severity of the damage condition.

12. A device for controlling an aircraft, comprising:
a fatigue management module configured to determine that a component of the aircraft is being stressed indicating a fatigue condition;
a damage detection module configured to determine that the component of the aircraft is structurally broken indicating a damage condition; and
a flight controller to implement an action when one of the fatigue condition of the component of the aircraft being stressed is detected or the damage condition of the component of the aircraft being structurally broken is detected.

13. The device of claim 12, wherein when the fatigue condition is detected, the action is selected from the group consisting of adjusting a command model to constrain maneuverability of the aircraft, adjusting feedback to lower fatiguing loads, and issuing an alert to a pilot that maneuvering characteristics are being reduced based on the detected fatigue condition.

14. The device of claim 12, wherein the fatigue condition is determined based at least in part on an estimated remaining useful life of component of the aircraft.

15. The device of claim 12, wherein when the damage condition is detected, the action is selected from the group consisting of adjusting a command model to constrain maneuverability of the aircraft, issuing an updated feed forward command to accommodate a modified aircraft dynamic, adjusting feedback to accommodate a modified aircraft dynamic, reconfiguring aircraft control inputs to mitigate effects of the damage condition, and issuing an alert to a pilot that maneuvering characteristics are being reduced based on the detected damage condition.

* * * * *